July 13, 1965   E. F. BOYER   3,194,318
CABBAGE HARVESTER
Filed Aug. 30, 1963   4 Sheets-Sheet 1

FIG. 1

INVENTOR.
EMANUEL F. BOYER
BY
*Attorney*

INVENTOR.
EMANUEL F. BOYER

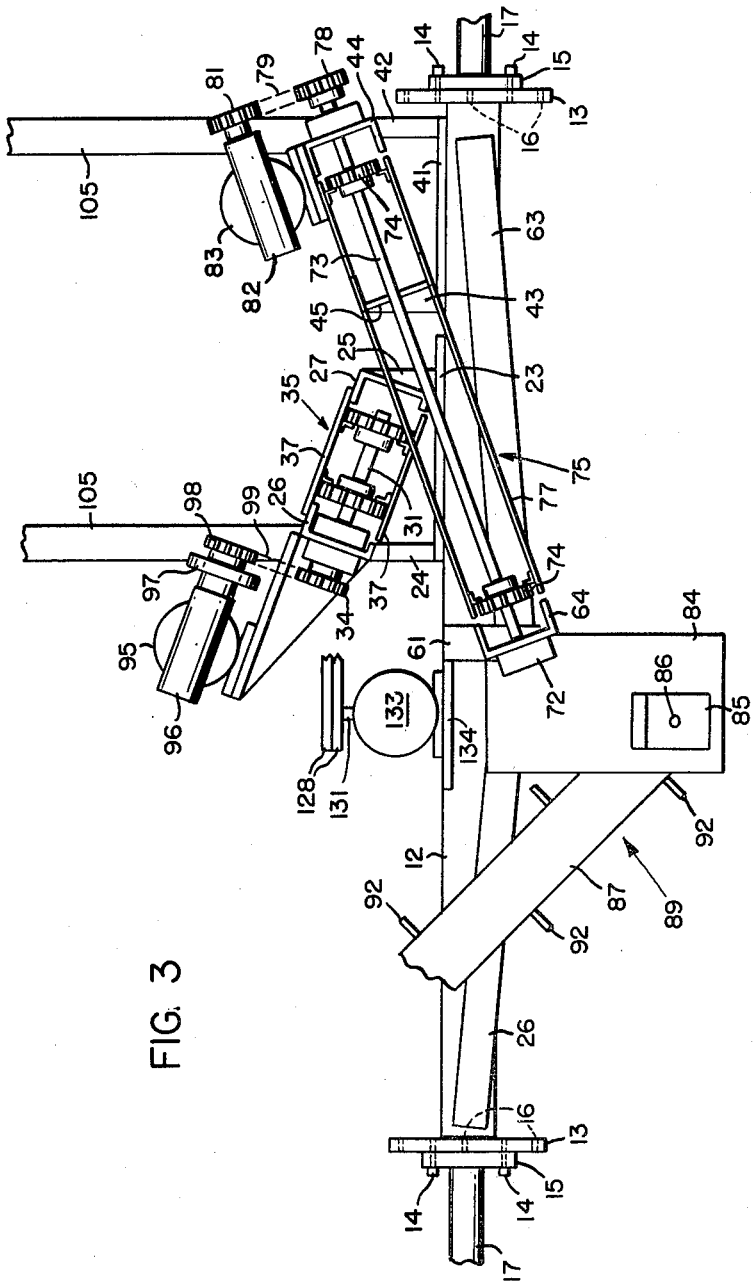

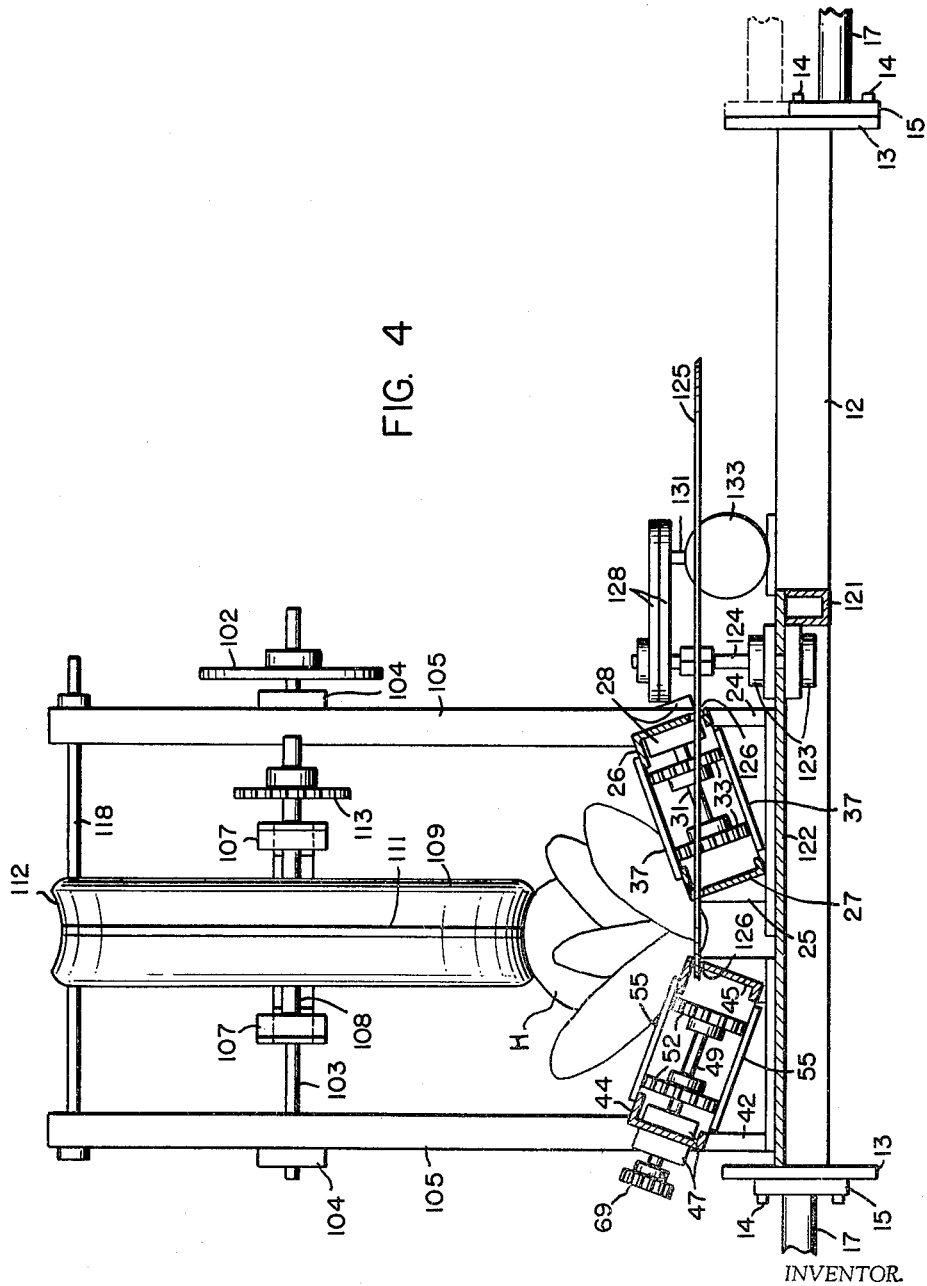

_United States Patent Office_

3,194,318
Patented July 13, 1965

3,194,318
CABBAGE HARVESTER
Emanuel F. Boyer, R.D. 2, Barre Center, Albion, N.Y.
Filed Aug. 30, 1963, Ser. No. 305,660
9 Claims. (Cl. 171—18)

This invention relates to a produce harvester, and more particularly to a machine for use in the fields for harvesting cabbage heads.

Heretofore it has been customary to harvest cabbage heads by hand, cutting each cabbage head from its stalk. Moreover, storage cabbage (normal table cabbage), after being cut from its stem, must be placed in bushel baskets disposed at convenient points along the cabbage rows in the field; and the baskets must thereafter be picked up and transported away, while kraut cabbage (large cabbage heads which are used to make sauerkraut) after being cut from their stems has to be thrown by pitchfork into the transport wagon. A good worker has been able to harvest at most about five tons of cabbage a day. This manual harvesting of cabbage is laborious, time-consuming and expensive.

One object of this invention is to provide a machine which will eliminate the harvesting of cabbage by hand, and substantially reduce the number of hours it takes to harvest a field of cabbage.

Another object of this invention is to provide a cabbage harvesting machine which cuts the stems and leaves from uprooted cabbage heads, and thereafter separates the cabbage heads from the severed stems and leaves.

Another object of this invention is to provide a machine for automatically uprooting, trimming and conveying cabbage heads directly into a transport wagon.

Another object of this invention is to provide a cabbage harvesting machine having an adjustable mechanism for trimming and conveying cabbage heads of different sizes, after they are uprooted.

Other objects of the invention will be apparent hereinafter from the specification, and from the recital of the appended claims, particularly when read in conjunction with the accompanying drawings.

In the drawings:

FIG. 1 is a plan view of a cabbage harvesting machine made in accordance with one embodiment of this invention, certain elements in the machine being shown fragmentarily;

FIG. 3 is a fragmentary end view of the machine looking in the direction of the arrows 3—3 in FIG. 2; and FIG. 4 is a fragmentary sectional view taken along the line 4—4 in FIG. 2 and looking in the direction of the arrows.

Figure 2:
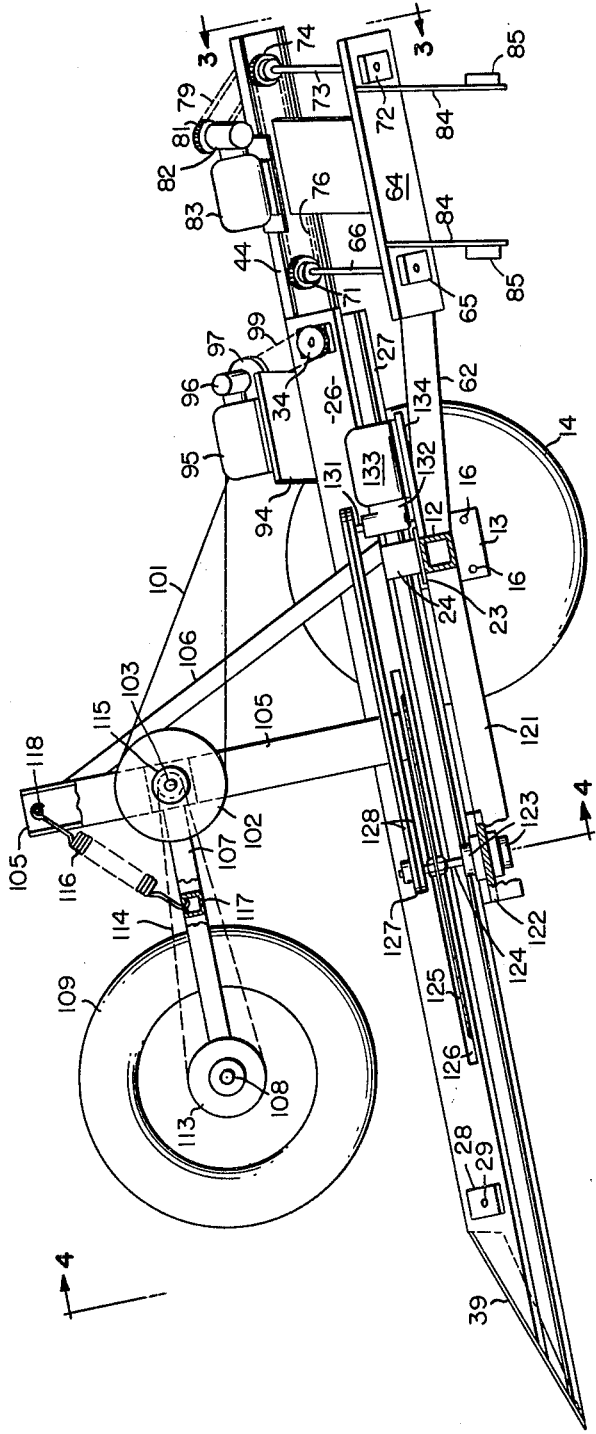
FIG. 2 is a fragmentary side elevational view of this machine, parts being broken away.

The harvesting machine illustrated comprises a frame carrying a pair of spaced, parallel conveyors, which are supported adjacent one end thereof upon the axle of a two-wheeled, tractor-drawn trailer, and which at their opposite ends project downwardly and forwardly of the trailer toward ground level. Adjacent the lower, forward ends of the conveyors the frame defines a bifurcated fork or scoop which is adapted to pass beneath and uproot cabbages as the trailer is drawn over a row of cabbage plants. The forward motion of the trailer urges the uprooted cabbages rearwardly of the scoop, and onto the conveyors. The conveyors then transport the plants upwardly and rearwardly on the frame, with the cabbage stems projecting downwardly between the conveyors and into the path of a rotating blade which severs the stems from the cabbages. The trimmed cabbage heads, together with the leaves, which become loose upon the removal of the stems, are fed onto a third conveyor supported on the frame at the upper, rear ends of the first-named conveyors. This third conveyor transports the cabbage heads and the severed leaves toward the rear of the trailer, but is inclined downwardly relative to opposite sides of the trailer so that the cabbage heads roll downwardly and sideways off of the third conveyor onto a fourth conveyor, while the severed leaves remain on the third conveyor until they are dumped thereby back onto the ground at the rear of the trailer. The fourth conveyor carries the trimmed cabbage heads upwardly and into a transport wagon that is drawn alongside the harvesting machine.

Referring now to the drawings by numerals of reference, the harvesting machine 11 comprises a tubular axle 12 which is rectangular in cross section and which has transverse, rectangular bearing plates 13 secured to opposite ends thereof, respectively. Removably secured to the outer face of each bearing plate 13 by a plurality of bolts 14 is a further rectangular plate 15. Each plate 13 has in its outer face a plurality of vertically spaced, threaded recesses 16 (FIG. 3) for bolts 14, so that each plate 15 may be secured in one of at least two different vertical positions (see broken and solid line positions in FIG. 4) relative to the axle 12. Secured at one end to the outer face of each plate 15 is a stub shaft 17. Rotatably mounted in a conventional manner on each shaft 17 are a conventional wheel and its tire 18.

Pivoted at one end on a pair of brackets 19 carried by the axle 12 adjacent one end thereof is a hitch 21 (only part of which is shown in FIG. 1) by means of which the harvesting machine 11 is adapted to be connected to a tractor or the like to be drawn along a row of cabbage plants.

Secured by screws 22 to the upper face of axle 12 for axial adjustment therealong is a rectangular adjusting plate 23. Welded to plate 23 are blocks 24 and 25 (FIGS. 3 and 4) on which are welded two laterally spaced, parallel channel irons 26 and 27, which are inclined to the horizontal. At their forward ends (to the left of the axle 12 in FIGS. 1 and 2) the channel irons 26 and 27 extend downwardly toward ground level, and at their rear ends they project upwardly beyond the rear of the axle 12.

Rotatably mounted in two sets of bearing blocks 28 (FIG. 1) disposed at opposite ends, respectively, of the channel iron 26, are two shafts 29 and 31, respectively. Secured to shaft 29 to rotate therewith in axially spaced relation to one another in the space between the forward ends of the channels 26 and 27 are a pair of sprockets 32. A further pair of axially spaced sprockets 33 is secured to shaft 31 to rotate therewith in the space between the rear ends of the channels 26 and 27. Shaft 31 extends outwardly through the web of channel 26 and has secured on its free end a sprocket 34 which is motor-driven as will be described in more detail below.

The sprockets 33 drive a conveyor belt shown in part in FIG. 1 and designated generally at 35. Belt 35 comprises a pair of endless chains 36, which travel over the pairs of sprockets 32 and 33, and a plurality of laterally spaced slats 37 which extend transversely between and are secured to the chains 36. The channel irons 26 and 27 confront one another, and at opposite ends their legs are notched out as at 38 to provide clearance for travel of the slats 37 around the sprockets 32 and 33. As shown more clearly in FIG. 4, the channels 26 and 27 are supported on the adjusting plate 23 in such manner that the axes of the shafts 29 and 31 are inclined to the axis of the axle 12.

Secured along one edge thereof to the lower, forward ends of the channel irons 26 and 27 is the base of a right triangular plate 39, the pointed end of which extends outwardly beyond the channel irons 26 and 27 to form part of a bifurcated scoop at the forward end of the machine 11.

Rigidly secured to the upper face of axle 12 adjacent the end of the adjusting plate 23 remote from hitch 21, is a plate 41 (FIG. 3). Secured adjacent to one end thereof to blocks 42 and 43, which are welded to plate 41, are a pair of spaced, parallel channel irons 44 and 45 (FIG. 4). The channel irons 44 and 45 are inclined, like channel irons 26 and 27, to axle 12, and extend at one end downwardly and forwardly of axle 12, and at their opposite ends above and to the rear of the axle. Channel iron 45 is substantially coextensive with the channel iron 27, while the channel iron 44, extends (FIGS. 1 and 2) rearwardly beyond the upper end of channel iron 45.

Rotatably journaled in bearing blocks 46 (FIGS. 1 and 4) at the forward end of channel iron 44, and in bearing blocks 47 adjacent the rear end of this channel iron opposite the rear end of channel iron 45, are two shafts 48 and 49, respectively, which extend through the web of channel iron 44 and into the space between the channel irons 44 and 45. Secured to shafts 48 and 49, respectively, to rotate in the space between the channel irons 44 and 45 are two axially spaced sprockets 51 and 52, over which travel a conveyor belt shown in part in FIG. 1, and designated generally at 53. The belt 53 comprises a pair of endless chains 54, each of which travels over aligned sprockets 51 and 52, and a plurality of spaced slats 55 which extend transversely of the chains 54. The legs of the channels 44 and 45 confront one another, and are notched out or recessed as at 56 (FIG. 1) to allow opposite ends of the slats to travel around the sprockets 51 and 52. The channel irons 44 and 45 are supported on the plate 41 in such manner that the axes of shafts 48 and 49 are inclined to and intersect the axes of the shafts 29 and 31, as shown more clearly in FIG. 4.

As in the case of the channel irons 26 and 27, the channel irons 44 and 45 have secured to their forward ends a rigid, right triangular plate 57 which projects beyond the forward ends of the channel irons to provide a pointed furcation which is adapted to cooperate with the pointed plate 39 in uprooting cabbages during the operation of the machine.

Welded to the rear face of the axle 12 medially of the axle, and projecting rearwardly therefrom is a block 61. Secured to the rear face of axle 12 adjacent opposite ends thereof, and extending diagonally inwardly and rearwardly to juncture with block 61 are two bars or straps 62 and 63. These bars or straps are welded to block 61. Welded to the rear end of block 61, and extending rearwardly therefrom in spaced, parallel confronting relation with the rear part of channel iron 44 is a further channel iron 64 (FIGS. 1 to 3).

Journaled at opposite ends thereof in aligned bearing blocks 65 carried by the channel irons 64 and 44 (FIG. 1) to rotate about an axis parallel to and spaced rearwardly from the shaft 49, is a shaft 66. Shaft 66 at one end projects beyond the web of channel iron 44 and has secured thereon a sprocket 67 which is connected by a chain 68 to a sprocket 69 carried by shaft 49 at the exterior of the channel iron 44. Secured on shaft 66 to rotate in the space between the channel member 64 and the channel member 44 is a pair of axially-spaced sprockets 71.

Journaled adjacent opposite ends thereof in bearing blocks 72 carried at the rear ends of the channel members 64 and 44, and extending therebetween parallel to the shaft 66 is a shaft 73. Secured to shaft 73 is a pair of axially spaced sprockets 74 that cooperate with sprockets 71 to carry a conveyor belt 75 (part of which is shown in FIG. 1).

Belt 75 comprises a pair of chains 76 which travel over the sprockets 71 and 74, and a plurality of spaced slats 77 which are secured to and extend transversely of the chains 76.

Shaft 73 at one end thereof extends beyond the outer face of the channel iron 44 and has secured thereon a sprocket wheel 78, which is connected by means of a chain 79 to a drive sprocket 81 carried by the output shaft of a gear box 82 which is operated by a motor 83 mounted on the channel iron 44 above the belt 75. The motor 83 thus drives the conveyor belt 75, and through the agency of the sprocket 67 on the shaft 66, the chain 68, and the sprocket 69 on shaft 49, is operative also to drive the conveyor belt 53.

Secured to the outside of, and projecting downwardly from, the channel member 64 is a pair of spaced plates 84 (FIGS. 1 to 3). Journaled at opposite ends thereof in bearings 85 secured to the plates 84 adjacent the lower ends thereof to rotate about an axis which is positioned below and extends transverse to the axes of the shafts 66 and 73, is a shaft 86. Two spaced, parallel side plates 87 are mounted at one end on shaft 86 against the inside faces of the plates 84, and project therefrom diagonally upwardly (FIG. 3).

Secured to shaft 86 inside of the side members 87 is a pair of axially spaced sprockets 88 which support one end of a conveyor belt shown in part in FIGS. 1 and 3, and designated generally at 89. The belt 89 comprises a pair of chains 91 which connects the pair of sprockets 88 to a further pair of sprockets (not illustrated) carried between the upper ends of the side plate 87, and a plurality of spaced conveyor slats 92 which extend transversely of the chains. Secured to and extending transversely between the side frame members 87 between and parallel to the upper and lower runs of the belt 89 is a rigid plate 93. The purpose and operation of conveyor 89 will be described in more detail below.

Mounted on a bracket 94 (FIGS. 1 to 3), which is sesured to the channel iron 26 adjacent the rear end thereof, is a motor 95 and a gear box 96 driven thereby. The output shaft of the gear box 96 has mounted thereon a pulley 97, and axially spaced therefrom a sprocket 98. Sprocket 98 is connected by a chain 99 to the drive sprocket 34 for the purpose of driving the conveyor belt 35.

Pulley 97 is connected by a belt 101 to a further pulley 102 secured on a shaft 103 which is mounted for rotation about an axis which extends parallel to axle 12 above and forwardly thereof. Adjacent opposite ends thereof the shaft 103 is rotatably journaled in bearing blocks 104 carried by a pair of channel irons 105 (FIGS. 1 and 2), which at one end thereof are secured to the upper surface of the channel irons 26 and 44, respectively, intermediate the ends thereof. The channel irons 105 project upwardly from the channel irons 26 and 44 in spaced, confronting relation, and are supported in their vertical positions my means of a pair of rigid braces 106, each of which extends diagonally between the upper end of a respective channel iron 105 and the associated channel iron 26 or 44.

A pair of spaced, parallel bars 107 (FIGS. 1 and 2) are pivotally mounted at one end thereof on the shaft 103. They carry between them at their free ends a rotatable shaft 108 which extends parallel to shaft 103. Secured to the shaft 108 to rotate therewith between the forward ends of the members 107 is a large rubber tired wheel 109 around the outer peripheral surface of which is secured a strap 111 (FIG. 4). This strap operates to draw the center of the tire radially inwardly so that its outer peripheral surface is substantially concave in cross section as shown at 112 in FIGS. 1 and 4. At one end thereof shaft 108 extends outwardly beyond one of the bars 107 and has secured thereon a pulley 113 which is connected by a belt 114 to a further pulley 115 secured on shaft 103. The arms 107 are resiliently urged upwardly by a coiled tension spring 116 that is secured at one end to a transverse brace 117, which extends between the arms 107, and at its opposite end to a rod 118 that extends between the upper ends of the channel irons 105.

Welded at one end to the forward face of the axle 12 adjacent the hitch 21, and extending forwardly of the axle parallel to the outer face of the channel iron 26 is a bar 121 (FIGS. 1, 2 and 4), which is generally rectangular in cross section. Secured to the upper surface of bar 21 adjacent its outer end, and extending at right angles therefrom transversely beneath the channel irons 26, 27, 45 and 44, and substantially midway between the ends of the last-mentioned channel irons, is a rigid, rectangular support plate 122. Rotatably mounted at one end thereof in bearings 123 carried on opposite sides of the support plate 122 is a shaft 124. Secured on shaft 124 intermediate the ends thereof is a large, disc-shaped cutter blade 125 which projects through aligned slots 126 (FIGS. 2 and 4) in the channel irons 26, 27 and 45, and extends transversely across the space between the channel members 27 and 45. Shaft 124 projects upwardly beyond the disc cutter 125 and has secured on its upper, free end a double sheave 127 (FIG. 1), which is connected by a pair of belts 128 to a double sheave 129 (FIG. 1) carried by the output shaft 131 of a gear box 132. Box 132 is connected to and actuated by a motor 133, which is supported beneath the motor 95 on a plate 134 that is welded to and projects rearwardly from the axle 12.

In operation, the hitch 21 of the machine 11 is connected to a tractor or the like, which draws the machine along a row of cabbage plants so that the forks 39 and 57 at the forward end of the machine project down into the ground along opposite sides of a row of plants. The forward motion of the machine 11 causes the cabbage plants to be uprooted and guided by the forks upwardly and rearwardly toward and onto the conveyor belts 35 and 53 with the heads resting on the belts and the stalks of the cabbages extending into the space between the channel irons 27 and 45. The motors 83 and 95 at this time are operating and the cabbages are transported by the belts 35 and 53 upwardly toward the rear of the machine. The downwardly extending cabbage stems will project into the path of the cutter blade 125, which at this time is being rotated by motor 133.

As the cabbages (one of which is shown at H in FIG. 4) approach the blade 125 they pass beneath and are engaged by the tire 109, which at the time is being rotated by motor 95. The rotating tire 109 presses the cabbage heads slightly downwardly to insure engagement of the cutting edge of the cutter 125 with the cabbage stems. The severed stems are free to drop downwardly between the channels 27 and 45 back onto the ground; and the trimmed cabbage heads, together with the leaves which normally are released or loosened upon the severing of the stem from the cabbage, continue to be transported upwardly by the conveyor belts 35 and 53 until they are dumped off these belts onto the conveyor belt 75 positioned beneath the rear ends of the channels 26, 27 and 45.

The motor 83 drives the belt 75 so that the upper run thereof travels from the left to the right in FIG. 1 However, as shown more clearly in FIG. 3, belt 75 is inclined between opposite sides thereof from the channel extension 44, downwardly toward the lower end of the conveyor belt 89. The cabbage heads falling onto the belt 75 are thus caused by gravity to roll downwardly off the side of the belt 75 onto belt 89, while the loose leaves remain upon the belt 75 and are discharged thereby, at the rear end of the machine, back onto the ground. The cabbage heads themselves are conveyed by belt 89 upwardly and to the side of the machine 11 to be dumped into a wagon or the like which is drawn alongside of the machine.

From the foregoing it will be apparent that applicant has provided an efficient and rugged harvesting machine, which will substantially eliminate the manual harvesting of cabbage heads; and which will reduce considerably the amount of time needed to harvest a field of cabbage. Also, applicant's machine is capable of harvesting both the small (storage) and large (kraut) size cabbage heads merely by removing the screws 22 and adjusting plate 23, and the channel irons 26 and 27 axially on the axle 12, thereby to increase or decrease the space between the channel irons 26 and 45 depending upon the size of the cabbage heads which are being harvested. Moreover the angle at which the forks 37 and 59 enter the ground can be adjusted by removing the bolts 14 and adjusting the plates 15 vertically on the plates 13.

The rotating tire 109 holds the cabbage heads firmly in place on the conveyors as they pass into engagement with the rotating cutter blade 125, thereby to avoid accidental jarring or bouncing of the heads away from the cutter blades at the critical moment of cutting. The angular disposition of the conveyor 75 relative to the conveyor 89, and to ground level, produces a simple and automatic means for separating the trimmed heads from the unwanted leaves and stems.

With the machine of this invention, one hundred feet of cabbage row can be harvested and trimmed per minute. This is three hundred to seven hundred pounds of cabbage per minute, depending on the type of cabbage. One ton of kraut cabbage can be cut and loaded onto a wagon in about three minutes. One ton of storage cabbage can be cut and loaded in about seven minutes; this is because the storage cabbage heads are smaller and weigh less. There are about one hundred heads of storage cabbage in one hundred feet of row, and about seventy-five feet of kraut cabbage in one hundred feet. The figures for cutting and loading by the machine of this invention are to be compared with the maximum of five tons of cabbage per day which a good man can cut by hand and basket.

In addition to the tremendous saving in time, applicant's machine eliminates hand labor and handling.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:
1. A cabbage harvesting machine comprising
 (a) a carriage adapted to be advanced on the ground along a row of cabbage plants,
 (b) means on said carriage for uprooting cabbage plants from a row during the advance of said carriage,
 (c) cutting means on said carriage for trimming the stems from the heads of the uprooted cabbage plants,
 (d) conveyor means mounted on said carriage for transporting uprooted cabbage plants past said cutting means to be trimmed thereby, and for transporting the heads of the plants and leaves severed from the heads toward a discharge point at the rear end of said conveyor means,
 (e) an endless conveyor belt having its upper run positioned beneath the rear end of said conveyor means to receive trimmed heads and leaves discharged off the rear end of said conveyor means, and
(f) means supporting said conveyor belt on said carriage with one side thereof higher than the other, whereby said upper run of said belt is inclined at an angle to the horizontal to cause the trimmed cabbage heads delivered onto said conveyor belt from said conveyor means to roll by gravity toward and off said other side of said belt, while the leaves are transported by said belt to a discharge point at one end thereof.

2. A cabbage harvesting machine comprising
(a) a carriage adapted to be advanced on the ground along a row of cabbage plants,
(b) means on said carriage for uprooting cabbage plants from a row during the advance of said carriage,
(c) a first conveyor comprised of a first pair of spaced endless belts on said carriage disposed rearwardly of said uprooting means for supporting and transporting uprooted plants toward the rear of said carriage with the stem portions of the plants depending downwardly between said belts,
(d) a blade movable transversely across the space between said belts to sever the stems and leaves from the heads of plants transported by said belts,
(e) a third conveyor belt mounted beneath the rear ends of said first pair of belts, and onto which the trimmed heads and leaves are delivered by said first pair of belts,
(f) means driving said third belt in a direction to deliver the leaves thereon to the rear end of said carriage, said third belt being inclined to the horizontal with one side thereof higher than the other, thereby to cause the trimmed cabbage heads thereon to roll downwardly off said other side thereof,
(g) a fourth conveyor belt mounted on said carriage with other end thereof positioned beneath said one side of said third belt to catch the heads which roll therefrom, and to convey them away, and
(h) means for adjusting the belts of said first conveyor toward and away from one another to change the space between them.

3. A cabbage harvesting machine as defined in claim 2 including means mounted above said first conveyor and engageable with the tops of the uprooted plants to press them resiliently downwardly between the belts of said first conveyor and into engagement with said blade.

4. A cabbage harvesting machine comprising
(a) a carriage adapted to be advanced on the ground along a row of cabbage plants,
(b) a pair of spaced, parallel conveyor belts mounted on said carriage to extend upwardly from the ground at the front of said carriage, and operative to transport uprooted plants upwardly and rearwardly of said carriage,
(c) a pair of spaced members projecting beyond the forward ends of said belts to uproot and guide plants onto said belts with the stem portions of the plants passing between said belts,
(d) resilient means mounted on said carriage to engage the tops of plants and to press the plants resiliently downwardly onto said belts,
(e) a blade movably mounted on said carriage and extending transversely across the space between the belts to engage and sever the stem and leaf portions from the heads of said plants,
(f) means mounted on said carriage rearwardly of said conveyor belts for sorting the trimmed cabbage heads from the leaf portions severed therefrom, and
(g) means for adjusting the space between said belts to permit trimming of relatively large plants of the kraut type, and smaller plants of the storage variety, respectively.

5. A cabbage harvesting machine as defined in claim 4 wherein said sorting means comprises
(a) a further conveyor belt mounted with one end thereof disposed beneath the rear ends of said pair of conveyor belts to receive the trimmed heads and leaves discharged by said pair of belts, and inclined to the horizontal to cause the trimmed heads to roll to one side of said further belt, and
(b) means for driving said further belt to transport the leaves thereon to the other end of said further belt.

6. A cabbage harvesting machine as defined in claim 4 wherein said resilient means comprises
(a) a wheel,
(b) means mounting said wheel above said pair of belts to rotate about an axis extending transverse to said belts, and in a vertical plane which bisects the space between said belts, and
(c) said wheel has a resilient peripheral surface which is concave in cross section and beneath which the tops of said plants must pass before reaching said blade.

7. A cabbage harvesting machine comprising
(a) a carriage adapted to be advanced on the ground along a row of cabbage plants,
(b) a pair of spaced, generally parallel, rigid housings mounted on said carriage and extending downwardly toward ground level at the front of said carriage,
(c) an endless belt mounted in each of said housings,
(d) said housings being inclined to the horizontal so that the upper runs of said belts extend from adjacent the forward ends of said housings upwardly and rearwardly of said carriage,
(e) means adjacent the lower, forward ends of said housings for uprooting cabbage plants from a row and guiding the plants onto the upper runs of said belts with the stems of said plants passing between the two belts,
(f) a rotating cutter blade mounted on said carriage adjacent one of said housings, and extending through slots in said housings beneath said upper runs, and transversely across the space between said runs,
(g) means for driving said belts in a direction to advance the plants carried thereby toward said blade,
(h) means mounted on said carriage above said belts to engage and urge the plants downwardly onto said belts, whereby the stem and leaf portions are severed from the heads of the plants as the plants are conveyed past said blade,
(i) a third endless belt mounted at the rear ends of the first-named belts to receive the heads and leaves trimmed therefrom,
(j) said third belt being inclined downwardly from one to the other side thereof, whereby the trimmed heads roll off said other side of said third belt,
(k) means for driving said third belt in a direction to convey the leaves thereon to one end of said third belt for discharge therefrom, and
(l) a fourth endless belt mounted adjacent said other side of said third endless belt to catch the heads which roll off said third belt and to carry them to a transport vehicle.

8. A cabbage harvesting machine as defined in claim 7 wherein said carriage comprises
(a) an axle having a pair of wheels mounted, respectively, at opposite ends of the axle, and
(b) means interposed between each wheel and the corresponding end of said axle for adjusting the axis of said axle vertically relative to the axis of said wheel, thereby to effect an adjustment in inclination of said uprooting means and of said housings relative to ground level.

9. A cabbage harvesting machine as defined in claim 3 wherein
(a) said housings are mounted on said axle adjacent one end thereof and extend transverse thereto, and including (b) means for adjusting one of said housings on said axle in a direction extending parallel to the axle, thereby to adjust the space between said housings.

References Cited by the Examiner

UNITED STATES PATENTS

| | | | |
|---|---|---|---|
| 2,645,889 | 7/53 | Warner | 171—62 X |
| 2,659,189 | 11/53 | Berg et al. | 209—114 X |
| 2,698,506 | 1/55 | Rushfeldt | 209—114 X |
| 2,855,058 | 10/58 | Krier et al. | 171—38 X |

FOREIGN PATENTS 146,109   4/62   U.S.S.R.

ABRAHAM G. STONE, *Primary Examiner.*

ANTONIO F. GUIDA, *Examiner.*